US009841666B2

United States Patent
Li et al.

(10) Patent No.: US 9,841,666 B2
(45) Date of Patent: Dec. 12, 2017

(54) RESTORATION SOLUTION FOR CINE FILM BUBBLE AND RESTORATION METHOD

(71) Applicant: Shaanxi Normal University, Xi'an (CN)

(72) Inventors: Yuhu Li, Shaanxi (CN); Zhihui Jia, Shaanxi (CN); Ting Zhou, Shaanxi (CN); Meirong Shi, Shaanxi (CN); Yajun Zhou, Xi'an (CN)

(73) Assignee: Shaanxi Normal University, Xi'an (CN)

( * ) Notice: Subject to any disclaimer, the term of this patent is extended or adjusted under 35 U.S.C. 154(b) by 39 days.

(21) Appl. No.: 15/192,257

(22) Filed: Jun. 24, 2016

(65) Prior Publication Data

US 2016/0377971 A1 Dec. 29, 2016

(30) Foreign Application Priority Data

Jun. 26, 2015 (CN) .......................... 2015 1 0364257

(51) Int. Cl.
*G03D 15/00* (2006.01)
*C09D 101/28* (2006.01)
*G03C 11/04* (2006.01)

(52) U.S. Cl.
CPC .......... *G03D 15/006* (2013.01); *C09D 101/28* (2013.01); *G03C 11/04* (2013.01)

(58) Field of Classification Search
CPC .... C09D 101/28; C09D 7/1241; G03C 11/04; G03D 15/006; B41M 5/3375
See application file for complete search history.

*Primary Examiner* — Bao-Luan Le
(74) *Attorney, Agent, or Firm* — Hanley, Flight & Zimmerman, LLC

(57) ABSTRACT

The present invention discloses a restoration solution for cine film bubble and a restoration method. The restoration solution comprises 100 parts by volume of n-butanol, 60 to 120 parts by volume of lacquer thinner having 5% by mass of ethyl cellulose, 8 to 20 parts by volume of diphenyl isooctyl phosphite, 2 to 10 parts by volume of bis (1,2,2,6, 6-pentamethyl-4-piperidyl) sebacate, and 2 to 15 parts by volume of petroleum ether. The present invention integrates micro-restoration, bubble puncture and optical filling, and effectively restores a bubble having a diameter of 0.1 mm to 1 mm generated between a film base layer and an emulsion layer of a cine film. The present invention has advantages of simple method of operation, low cost and good controllability. And the used restoration solution has good thermal stability, oxidation resistance, and permeability, and can eliminate the phenomenon of light scattering within the bubble, so that patterns and writing of the original image data are explicitly presented, and a better restoration effect is achieved without damages to films. Therefore, the restoration solution has good application values and market prospects.

4 Claims, 2 Drawing Sheets

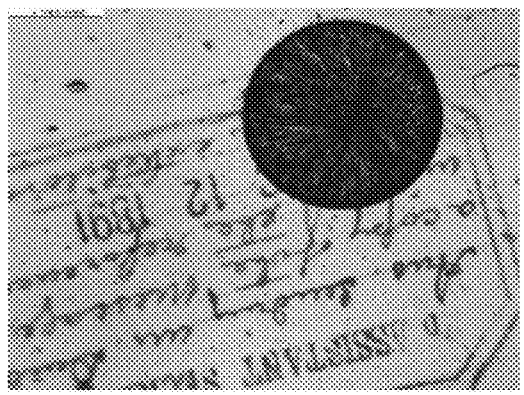
Figure 1                    Figure 2
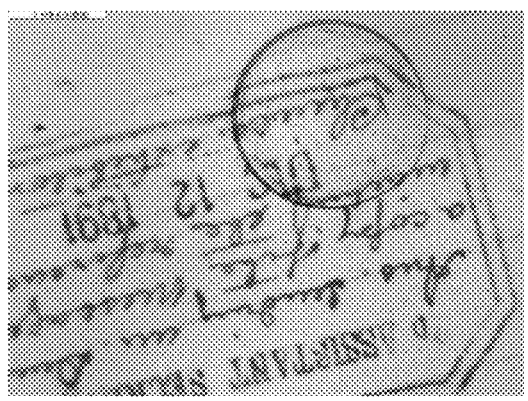
Figure 3                    Figure 4
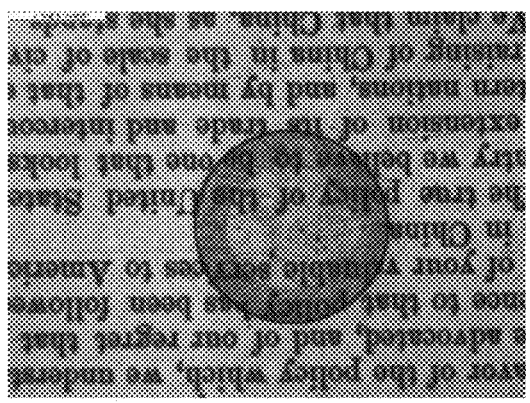
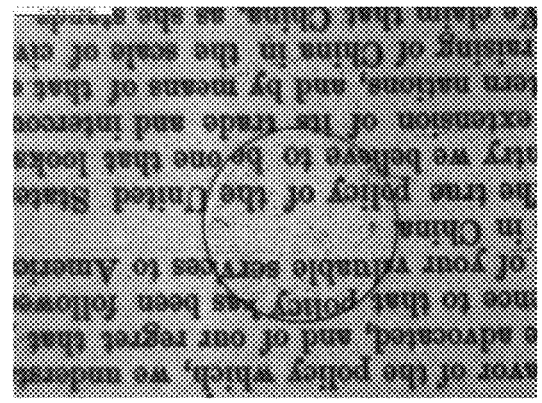
Figure 5                    Figure 6

RESTORATION SOLUTION FOR CINE FILM BUBBLE AND RESTORATION METHOD

RELATED APPLICATION

This patent claims priority to Chinese Patent Application No. 201510364257.X, which was filed on Jun. 26, 2015, and is hereby incorporated by reference in its entirety.

FIELD OF THE INVENTION

The present invention pertains to the field of image file protection and restoration, particularly relates to a cellulose acetate restoration solution for film bubble and a restoration method.

BACKGROUND OF THE INVENTION

A cine film, being a particularly important live-action file and artistic information carrier, is a significant component of the modern and contemporary image file protection. A cellulose acetate film is a kind of film file used most widely and of more collection. A cellulose acetate cine film is prone to mildew, acetic acid syndrome and other diseases under the influence of its own constituent materials and the preservation environment. A bubble disease of the cellulose acetate cine film is primarily formed along with the development of the acetic acid syndrome. A film base material, i.e., cellulose triacetate, constantly degrades under the influence of preservation environment so that the film exudes a pungent odor of acetic acid and the concentration is gradually increased; a film base plasticizer is precipitated out between a film base layer and an emulsion layer and bubbles are generated. There is no regularity of the position where those bubbles are generated. Some bubbles grow over image information, and thus cover valuable image data information, since plasticizers are filled inside the bubbles, which has a significant impact on the subjective quality of the image. The image quality of numerous valuable cine films in history is badly damaged due to the effect of bubbles, which greatly damages the preserving value for cine films. Therefore, it is necessary to employ appropriate techniques for restoration, so as to retain valuable movies.

As a bubble has a diameter ranging from 0.1 mm to 1 mm, and is generated between the film base layer and the emulsion layer, it is difficult for restoration in conventional methods, and so far no example of restoration of bubble disease of cine films has been yet reported. How to develop a method of effectively restoring a cine film bubble has become an urgent problem to be solved in the current cine film restoration and protection.

SUMMARY OF THE INVENTION

The technical problem to be solved by the present invention is to provide a restoration solution for cine film bubble having good thermal stability, oxidation resistance and permeability, and a method of restoring a cine film using the restoration solution.

The technical solution employed for solving the technical problem lies in that a restoration solution for cine film bubble comprising materials in parts by volume ratio as follows:
100 parts of n-butanol;
60 to 120 parts of lacquer thinner having 5% by mass of ethyl cellulose;
8 to 20 parts of diphenyl isooctyl phosphite;
2 to 10 parts of bis (1,2,2,6,6-pentamethyl-4-piperidyl) sebacate; and
2 to 15 parts of petroleum ether.

The restoration solution for cine film bubble in the present invention preferably comprising materials in parts by volume ratio as follows:
100 parts of n-butanol;
80 to 100 parts of lacquer thinner having 5% by mass of ethyl cellulose;
10 to 15 parts of diphenyl isooctyl phosphite;
5 to 8 parts of bis (1,2,2,6,6-pentamethyl-4-piperidyl) sebacate; and
5 to 10 parts of petroleum ether.

The restoration solution for cine film bubble in the present invention optimally comprising materials in parts by volume ratio as follows:
100 parts of n-butanol;
100 parts of lacquer thinner having 5% by mass of ethyl cellulose;
14 parts of diphenyl isooctyl phosphite;
6 parts of bis (1,2,2,6,6-pentamethyl-4-piperidyl) sebacate; and
10 parts of petroleum ether.

The "comprising" in the present invention includes "primarily comprising", the "primarily comprising" indicates that other ingredients that do not affect the performance or effect may also be added in the restoration solution for cine film bubble in the present invention, in particular, the "comprising" indicates consisting of the listed materials.

A method of preparation of the restoration solution for cine film bubble is as follows: a restoration solution for cine film bubble is prepared by adding ethyl cellulose in lacquer thinner, stirring under reflux for 2 hours at 120° C. to completely dissolve the ethyl cellulose and thus to prepare a lacquer thinner having 5% by mass of ethyl cellulose; and homogeneously mixing n-butanol, the lacquer thinner having 5% by mass of ethyl cellulose, bis (1,2,2,6,6-pentamethyl-4-piperidyl) sebacate and diphenyl isooctyl phosphite in the parts by volume ratio as described above under ultrasonic wave.

The method of restoring a cine film bubble using the restoration solution for cine film bubble of the present invention comprising the steps of:

1. Cleaning positioning emulsion layer of a cine film to be restored upwardly in a field of a microscope connected to a display, photographing with transmitted light, wetting the emulsion layer of the bubble surface with a cotton swab dipped with n-butanol and cleaning it up, then puncturing the middle section of the bubble surface by a needle having a diameter of the tip of 50 to 200 μm, repeatedly pressing the bubble surface with the cotton swab dipped with n-butanol to penetrate n-butanol into the interior of the bubble for dissolving plasticizers and cleaning the plasticizers up, and subsequently adsorbing the n-butanol and plasticizers thoroughly along edges of the bubble with filter paper and drying in natural conditions; and 2. Restoration repeatedly pressing the bubble surface with a cotton swab dipped with the restoration solution to penetrate the restoration solution into the interior of the bubble and meanwhile to completely expel air from the bubble.

The restoration solution of the present invention uses an ethyl cellulose solution with non-toxicity and good thermal stability as a main filler, on the basis thereof, adding non-volatile, liquid, and hindered amine type light stabilizers, i.e., bis (1,2,2,6,6-pentamethyl-4-piperidyl) sebacate and diphenyl isooctyl phosphite, both of which have a good synergistic effect, can decompose peroxides formed in the process of oxidation of organic materials, can effectively prevent the organic materials from oxidizing, fading and aging, and meanwhile adding low boiling or volatile petroleum ether which increases permeability of the solution and shortens time when the restoration solution is filled in the bubble to form films. The restoration solution in the present invention has good thermal stability, oxidation resistance and permeability, and can eliminate the phenomenon of light scattering within the bubble, so that patterns and writing of the original image data are explicitly presented, and a better restoration effect is achieved without damages to films.

The present invention integrates micro-restoration, bubble puncture and optical filling, and effectively restores a bubble having a diameter of 0.1 mm to 1 mm generated between a film base layer and an emulsion layer of a cine film. The present invention has advantages of simple method of operation, low cost, and good controllability, so that the present situation of fading and blurring of patterns and writing of the original image data is efficiently improved. Therefore, the restoration solution has good application values and market prospects.

BRIEF DESCRIPTION OF THE DRAWINGS

FIG. 1 is a micrograph of a cine film to be restored.
FIG. 2 is a micrograph of the cine film in FIG. 1 after cleaning.
FIG. 3 is a micrograph of the cine film in FIG. 2 after restoration.
FIG. 4 is a micrograph of a cine film to be restored.
FIG. 5 is a micrograph of the cine film in FIG. 4 after cleaning.
FIG. 6 is a micrograph of the cine film in FIG. 5 after restoration.

DETAILED DESCRIPTION OF THE INVENTION

Figure 7:
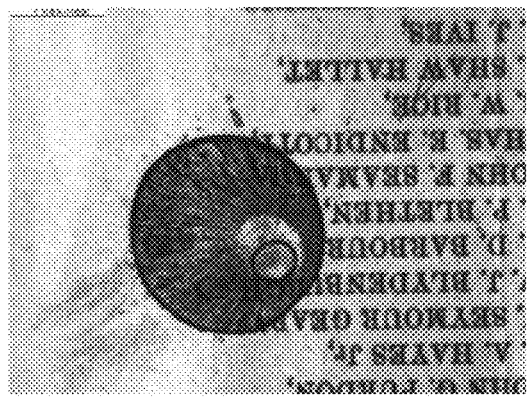
FIG. 7 is a micrograph of a cine film to be restored.

The present invention will be further described with reference to Figures and Examples to which, however, the invention is not restricted.

Example 1

A restoration solution for cine film bubble is prepared by adding 10 g ethyl cellulose in 190 g lacquer thinner, stirring under reflux for 2 hours at 120° C. to completely dissolve the ethyl cellulose and thus to prepare a lacquer thinner having 5% by mass of ethyl cellulose; and taking 100 mL of the lacquer thinner having 5% by mass of ethyl cellulose, 100 mL n-butanol, 14 mL diphenyl isooctyl phosphite, 6 mL bis (1,2,2,6,6-pentamethyl-4-piperidyl) sebacate and 10 mL petroleum ether, and homogeneously mixing the same under ultrasonic wave.

The method of restoring a cine film bubble using the restoration solution for cine film bubble prepared in this Example is as follows:
1. Cleaning
positioning emulsion layer of a cellulose acetate film to be restored (FIG. 1) upwardly in a field of a microscope disposed on a XWY-VI fiber analyzer, photographing with transmitted light at 110×, moving the bubble to be restored within the field of view of a display, wetting the emulsion layer of bubble surface with a cotton swab dipped with n-butanol and cleaning it up, then puncturing the middle section of the bubble surface by a silver needle having a diameter of the tip of 80 μm, repeatedly pressing the bubble surface with the cotton swab dipped with n-butanol to penetrate n-butanol into the interior of the bubble for dissolving plasticizers, achieving the purpose of cleaning up the plasticizers inside the bubble in the process of repeatedly dipping n-butanol and pressing, and subsequently adsorbing the n-butanol and plasticizers thoroughly along edges of the bubble with filter paper and drying in natural conditions. The result is shown in FIG. 2.
2. Restoration
Repeatedly pressing the cleaned bubble surface with a cotton swab dipped with the restoration solution to penetrate the restoration solution into the interior of the bubble, and the restoration solution is filled inside the entire bubble while air is squeezed out. The result is shown in FIG. 3.

As can be seen from FIG. 2, the plasticizers are cleaned up and the image data are presented in the cleaning process, however, the emulsion layer generates an interval interface due to scratching, folding, twisting, and the like, such that a phenomenon of light scattering occurs, i.e., fading and blurring of patterns and writing of the original image data. As can be seen from FIG. 3, after filling the interval interface using the restoration solution of the present invention, the solution forms a film inside the bubble, thereby eliminating the phenomenon of light scattering, so that the patterns and writing of the original image data are explicitly presented, and a better restoration effect is achieved.

Example 2

A restoration solution for cine film bubble is prepared by taking 80 mL of lacquer thinner having 5% by mass of ethyl cellulose, 100 mL n-butanol, 10 mL diphenyl isooctyl phosphite, 5 mL bis (1,2,2,6,6-pentamethyl-4-piperidyl) sebacate and 5 mL petroleum ether, and homogeneously mixing the same under ultrasonic wave.

The method of restoring a cine film bubble using the restoration solution for cine film bubble prepared in this Example is the same as that in Example 1, and the result is shown in FIG. 4 to FIG. 6. As can be seen from the Figures, the patterns and writing of the original image data of the restored cellulose acetate film are explicitly presented.

Example 3

A restoration solution for cine film bubble is prepared by taking 100 mL of lacquer thinner having 5% by mass of ethyl cellulose, 100 mL n-butanol, 15 mL diphenyl isooctyl phosphite, 8 mL bis (1,2,2,6,6-pentamethyl-4-piperidyl) sebacate and 10 mL petroleum ether, and homogeneously mixing the same under ultrasonic wave.

Figure 8:
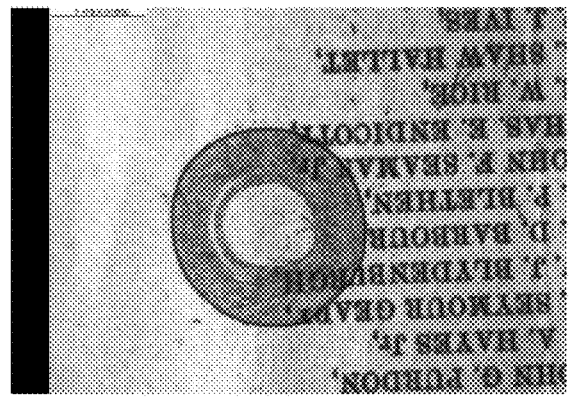
FIG. 8 is a micrograph of the cine film in FIG. 7 after cleaning.
Figure 9:
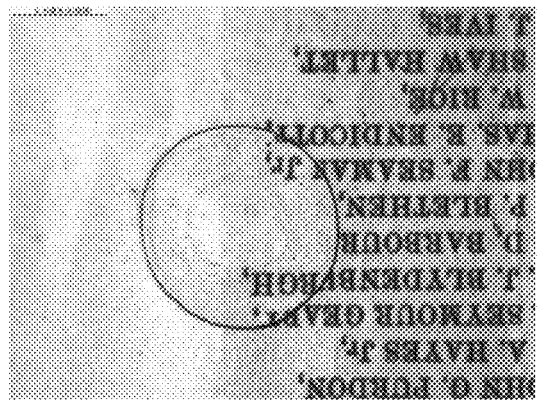
FIG. 9 is a micrograph of the cine film in FIG. 8 after restoration.

The method of restoring a cine film bubble using the restoration solution for cine film bubble prepared in this Example is the same as that in Example 1, and the result is shown in FIG. 7 to FIG. 9. As can be seen from the Figures, the patterns and writing of the original image data of the restored cellulose acetate film are explicitly presented.

Example 4

A restoration solution for cine film bubble is prepared by taking 60 mL of lacquer thinner having 5% by mass of ethyl cellulose, 100 mL n-butanol, 8 mL diphenyl isooctyl phosphite, 2 mL bis (1,2,2,6,6-pentamethyl-4-piperidyl) sebacate and 2 mL petroleum ether, and homogeneously mixing the same under ultrasonic wave.

Example 5

A restoration solution for cine film bubble is prepared by taking 120 mL of lacquer thinner having 5% by mass of ethyl cellulose, 100 mL n-butanol, 20 mL diphenyl isooctyl phosphite, 10 mL bis (1,2,2,6,6-pentamethyl-4-piperidyl) sebacate and 15 mL petroleum ether, and homogeneously mixing the same under ultrasonic wave.

The invention claimed is:

1. A restoration solution for cine film bubble comprising materials in parts by volume ratio as follows:
   100 parts of n-butanol;
   60 to 120 parts of lacquer thinner having 5% by mass of ethyl cellulose;
   8 to 20 parts of diphenyl isooctyl phosphite;
   2 to 10 parts of bis (1,2,2,6,6-pentamethyl-4-piperidyl) sebacate; and
   2 to 15 parts of petroleum ether.

2. The restoration solution for cine film bubble according to claim 1 comprising materials in parts by volume ratio as follows:
   100 parts of n-butanol;
   80 to 100 parts of lacquer thinner having 5% by mass of ethyl cellulose;
   10 to 15 parts of diphenyl isooctyl phosphite;
   5 to 8 parts of bis (1,2,2,6,6-pentamethyl-4-piperidyl) sebacate; and
   5 to 10 parts of petroleum ether.

3. The restoration solution for cine film bubble according to claim 1 comprising materials in parts by volume ratio as follows:
   100 parts of n-butanol;
   100 parts of lacquer thinner having 5% by mass of ethyl cellulose;
   14 parts of diphenyl isooctyl phosphite;
   6 parts of bis (1,2,2,6,6-pentamethyl-4-piperidyl) sebacate; and
   10 parts of petroleum ether.

4. A method of restoring a cine film bubble using the restoration solution of claim 1 comprising the steps of:
   (1) Cleaning
   positioning emulsion layer of a cine film to be restored upwardly in a field of a microscope connected to a display, photographing with transmitted light, wetting the emulsion layer of bubble surface with a cotton swab dipped with n-butanol and cleaning it up, then puncturing the middle section of the bubble surface by a needle having a diameter of the tip of 50 to 200 µm, repeatedly pressing the bubble surface with the cotton swab dipped with n-butanol to penetrate n-butanol into the interior of the bubble for dissolving plasticizers and cleaning the plasticizers up, and subsequently adsorbing the n-butanol and plasticizers thoroughly along edges of the bubble with filter paper and drying in natural conditions; and
   (2) Restoration
   repeatedly pressing the bubble surface with a cotton swab dipped with the restoration solution to penetrate the restoration solution into the interior of the bubble and meanwhile to completely expel air from the bubble.

* * * * *